United States Patent [19]

Pucci et al.

[11] 4,343,731

[45] Aug. 10, 1982

[54] EPOXY RESIN COMPOSITION AND PROCESS FOR PRODUCTION

[75] Inventors: Donald G. Pucci, Lafayette; Ralph T. Everly, Coshocton, both of Ohio

[73] Assignee: General Electric Company, Schenectady, N.Y.

[21] Appl. No.: 221,004

[22] Filed: Dec. 29, 1980

[51] Int. Cl.$^3$ ............................................. C08K 5/05
[52] U.S. Cl. .................................. 523/427; 528/102; 528/103; 524/376
[58] Field of Search .............................. 528/103, 102; 260/33.4 R

[56] References Cited

U.S. PATENT DOCUMENTS

| | | | |
|---|---|---|---|
| 3,277,048 | 10/1966 | Sonnabend | 528/102 |
| 3,438,849 | 4/1969 | Isack | 528/103 |
| 3,523,037 | 8/1970 | Chellis | 528/103 |
| 3,547,885 | 12/1970 | Dante et al. | 528/103 |
| 3,931,109 | 1/1976 | Martin | 528/102 |

*Primary Examiner*—Joseph L. Schofer
*Assistant Examiner*—N. Sarofim
*Attorney, Agent, or Firm*—Hedman, Casella, Gibson & Costigan

[57] ABSTRACT

An epoxy resin composition capable of application at elevated solids levels is disclosed. The composition is produced by low temperature catalytic fusion of (a) a glycidyl ether of bisphenol A and (b) a glycidyl ether of bisphenol A containing a fusion catalyst with (c) tetrabromobisphenol A.

This composition may be utilized to facilitate forming improved epoxy coatings and laminates.

9 Claims, No Drawings

EPOXY RESIN COMPOSITION AND PROCESS FOR PRODUCTION

BACKGROUND OF THE DISCLOSURE

Epoxy resin compositions are well known for a variety of different uses. These uses range from protective coatings and finishes to structural plastic articles.

Most commonly, these compositions are produced in a series of steps. The principal reactants from which they are initially formulated are epichlorohydrin and a polyhydric material—usually a bisphenol A compound. These reactants may be condensed or fused in the presence of a variety of known catalysts, to produce epoxy (or, more specifically, glycidyl ether) compositions.

Many such resin compositions are commercially available. They may be obtained as such or in further combination with conventional curing agents and/or solvents which facilitate application for their individual end uses. Incident to application, these curing agents affect further coupling of the epoxy-ethers to their ultimate, form or use.

Despite long investigation of these epoxy resin compositions and the availablilty of many different ones, certain desired properties have yet to be achieved. In particular, attempts to provide higher solids content compositions for coating and similar uses have heretofore proven unsuccessful.

In the past, epoxy compositions have generally been limited to a maximum resin solids content of about 60% by weight. This was particularly true in, for example, lamination utilities where proper "wet-out" or impregnation of such supports as glass cloth was involved. As a result, application of such compositions has involved treatment for removal of substantial amounts of liquid component—most of which is solvent—from the composition.

More concentrated compositions would, of course, assuage the burden of this final production treatment. They would also allow thicker, individual applications. However, ones having both this and the properties satisfactory for earlier production steps have not been available.

INTRODUCTION TO THE INVENTION

Epoxy resin compositions having both elevated solids contents and satisfactory wet-out properties have been discovered. These compositions may have a resin solids concentration of up to about 85% by weight, while still retaining the physical properties adequate to, for example, impregnate laminates of woven glass cloth.

These compositions comprise the fusion product of:
(a) a glycidyl ether of bisphenol A and
(b) a glycidyl ether of bisphenol A containing a fusion catalyst with
(c) tetrabromobisphenol A, where the ethers are present in a weight ratio—(a) to (b)—of from 2:1 to 2.5:1. This fusion product is normally utilized as from 70 to 85% by weight of a solvent-containing varnish-type epoxy resin composition.

To produce these compositions, a dispersion of fusion catalyst, tetrabromobisphenol A and the two glycidyl ethers is formed. The dispersion is then heated to a fusion temperature of not more than 120° C., where it is held until solution occurs and the desired product is formed. The resin product is then cooled to below 60° C. to stop the fusion reaction.

The resultant epoxy resin composition is ready for use. It may simply be combined with a conventional curing agent and, if desired, any preferred solvent. It may then be sprayed or painted on the desired support. There it will cure and dry to a hard, solid form.

DESCRIPTION OF THE INVENTION

In forming the tetrabromobisphenol A-fusion product of this invention, two distinct glycidyl ethers are involved. For convenience, they are referred to herein as ethers (a) and (b).

Glycidyl ether reactant (a) is the condensation product of epichlorohydrin and bisphenol A. These ingredients are normally in a mole ratio of from 2.0 to 1.0, respectively. The condensation is readily accomplished at about 150° C. in accordance with known technique. Alternatively, suitable product is readily available commercially including, for example, that sold under the trademark EPON 828 by Shell Chemical Corporation.

The second glycidyl ether reactant, (b), is also the condensation product of epichlorohydrin and bisphenol A. However, ether reactant (b) normally contains from 0.01 to 0.05 weight percent fusion catalyst. Condensation product (b) may be made as described above and is again commercially available, for example, under the trademark EPON 829 as sold by Shell Chemical Corporation.

In the fusion product resins of this invention, ethers (a) and (b) should be present in a weight ratio of from 2:1 to 2.5:1, more desirably about 2.3:1. From about 30% to 100% tetrabromobisphenol A units by total weight is incorporated into the fusion product. Preferably, however, a substantial excess is added to the dispersion before allowing the fusion reaction to proceed. Commonly, the ethers are initially combined with from 50 to 100% of their total weight of tetrabromobisphenol A. In this manner, adverse side reactions are minimized and yield maximized.

Before the tetrabromobisphenol A and ethers (a) and (b) will undergo fusion, one further ingredient must be present in their dispersion. This ingredient is a catalyst. Numerous fusion catalysts are already known. They include, by way of example, strong bases such as sodium or potassium hydroxide (alone or in combination, for a two-stage fusion, with stannic chloride, aluminum chloride or boron fluoride complexes and the like). Preferably, however, fusion catalysts such as those described in U.S. Pat. No. 3,477,990 and sold as an ingredient of Epon 829 (Shell Chemical Company) are utilized in accordance with this invention. The said patent is incorporated herein by reference.

The preferred fusion catalysts are phosphonium halides. Preferred phosphonium halides are those conforming to the formula

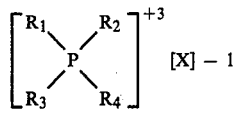

wherein X is a halogen atom, and $R_1$, $R_2$, $R_3$ and $R_4$ are the same or different and represent hydrocarbon residues which may or may not be substituted by one or more functional groups, such as halogen atoms. These phosphonium halides may generally be prepared by mixing in approximately equimolar proportions of phosphine with a halide. The mixing may be carried out with or without the application of heat, alone or in the presence of an inert solvent such as, for example, diethylether, benzene, chloroform or carbon tetrachloride.

Preferred phosphines are the organic phosphines, i.e., compounds of the formula $$P(R)_3$$

wherein at least one R is an organic radical and the other R's are hydrogen or organic radicals and preferably hydrocarbon radicals or substituted hydrocarbon radicals which may contain no more than 25 carbon atoms. Examples of the phosphines include triphenyl phosphine, tributyl phosphine, trilauryl phosphine, tricyclohexyl phosphine, trihexyl phosphine, triallyl phosphine, tridodecyl phostrieicosadecyl phosphine, trichlorobutyl phosphine, triethoxybutyl phosphine, trihexenyl phosphine, trixylyl phosphine, trinaphthyl phosphine, tricyclohexenyl phosphine, tri(3,4-diethyloctyl)phosphine, trioctadecyl phosphine, dioctyldecyl phosphine, dicyclohexyl phosphine, dibutyl allyl phosphine and the like, and mixtures thereof.

Particularly preferred phosphines to be employed include the trihydrocarbyl, dihydrocarbyl and monohydrocarbyl phosphines wherein the hydrocarbyl radicals (hydrocarbon radicals) contain from 1 to 18 carbon atoms, and more particularly those wherein the hydrocarbon radicals are alkyl cycloalkyl, alkenyl, cycloalkenyl, aryl, alkaryl, arylalkyl, and the like radicals. Coming under special consideration are the phosphines containing at least one and preferably three aromatic radicals.

Compounds to be mixed with the phosphine in the preparation of the phosphonium halide catalyst include organic halides.

Preferred organic halides are those wherein the organic radical is a hydrocarbon radical, preferably having from 1 to 10 carbon atoms. Examples of preferred organic halides include methylchloride, ethyl chloride, methyl bromide, ethyl bromide, methyl iodide, ethyl iodide, propyl iodide, n-butyl iodide, sec-butyl iodide and n-decyl iodide.

Examples of the above-noted phosphonium catalysts include, among others, methyl triphenyl phosphonium iodide, ethyl triphenyl phosphonium iodide, propyl triphenyl phosphonium iodide, n-butyl triphenyl phosphonium iodide, iso-butyl triphenyl phosphonium iodide, sec-butyl triphenyl phosphonium iodide, n-pentyl triphenyl phosphonium iodide, n-decyl triphenyl phosphonium iodide, methyl tributyl phosphonium iodide, ethyltributyl phosphonium iodide, propyl tributyl phosphonium iodide, methyl triphenyl phosphonium chloride, ethyl triphenyl phosphonium chloride, propyl tributyl phosphonium iodide, n-butyl triphenyl phosphonium chloride and ethyl triphenyl phosphonium bromide.

The amount of the fusion catalyst will vary over a wide range. In general, amount of catalyst will vary from about 0.001% by weight, and more preferably from about 0.05% to about 5% by weight of the reactants.

The fusion reaction itself must take place under carefully controlled conditions. Most importantly, while an elevated temperature is necessary for the reaction to proceed, the temperature of the reactants should not be more than 120° C. The fusion reaction itself should also be monitored. The reaction should be terminated when the average molecular weight of the resin is from 500 to 700. This point is reached quickly. Accordingly, it is preferred that reaction parameters of a temperature of 100° to 120° C. and time of from 10 to 20 minutes be utilized. Still more preferably, these parameters are about 115° C. and 15 minutes.

The reaction is desirably carried out under conditions minimizing outside influence. For this purpose, an inert atmosphere such as nitrogen or carbon dioxide—alone or in combination with partial vacuum—should be employed.

After the desired fusion product resin has been produced, the temperature of the resin should be reduced to below 50° C. to stop the reaction. This may be accomplished simply by ceasing heating and allowing the resin to cool. Preferably, however, the cooling should be accelerated. This may be accomplished most conveniently by addition of one or more aliquots of resin solvent. Ambient or mild temperature solvent quickly quenches the fusion reaction.

A resin composition suitable for use as, for example, the preferred varnish or coating material, may be prepared simply by combining the fusion product with a conventional curing agent and, if desired, resin solvent. Suitable curing agents are well known and include the preferred dicyandiamide or combination of dicyandiamide with tetramethylguanidine. From about 1 to 5% of curing agent by weight of resin solids is generally utilized.

The amount of solvent in the present compositions may vary widely, usually dependent upon end use and desired mode of application. As previously described, however, an important objective of this invention is a composition having an elevated solids content. Accordingly, sufficient solvent to produce a composition having from 70 to 85% solids by total weight is preferred. Such a composition greatly facilitates subsequent application and the final curing/drying steps.

Actual use of the present compositions may be accomplished in accordance with conventional laminating techniques. Thus, for example, the composition may simply be sprayed or coated onto woven glass cloth and several layers of resin/glass composite may be heated under pressure to form laminates. The only variation involves the fact that a thicker coating or application is obtained by use of the subject, higher solids content compositions.

The following example is only illustrative of the present invention. It is not limitive of its scope.

EXAMPLE

A kettle is first purged with nitrogen gas and then filled with 896 grams of EPON 828 and 384 grams of EPON 829 (which, in addition to ether, already contains approximately 0.1 grams of a fusion catalyst). After stirring to ensure admixture, 712 grams of tetrabromobisphenol A is added under continuous agitation.

The resultant dispersion is heated in the kettle to 115° C. and maintained at that temperature for 15 minutes. Thereafter the resin is removed from the heat source and allowed to cool. Next, 128 grams of ambient temperature methoxyethanol solvent are added during cooling when the resin reaches 80° C. and 152 grams of ambient temperature dimethylformamide solvent are added at 60° C. to accelerate this step.

Analysis of the ambient temperature epoxy resin composition showed an average molecular weight of 640.

The resin composition was formulated into a resin varnish by admixture of the following:
- resin solids—1000 grams
- dimethylformamide (solvent)—103 grams
- dicyandiamide (curing agent)—25.7 grams
- tetramethylguanidine (curing agent)—4.8 grams
- paste dye—3.4 grams This epoxy resin composition has a solids content of about 80%. On application over woven glass cloth, it provides satisfactory impregnation and accelerated drying of the coating.

This coating is done on a commercial 40-foot treater containing three heating zones with varying temperatures. The woven glass cloth is impregnated at speeds of 40 to 50 ft.min. which gives far superior "wet-out" (degree resin impregnates glass cloth) when compared to using conventional coatings. In addition, due to the higher solvent content of conventional coatings, treating speeds using conventional resins are limited to approximately 20 ft./minute in order to obtain sufficient "wet-out" and dry the coating. It is understood that changes may be made in this particular embodiment in the light of the foregoing and well-known teachings. These will remain within the scope of this invention which is defined in the following claims.

We claim:

1. An epoxy resin composition comprising the fusion product of:
   (a) a diglycidyl ether of bisphenol A and
   (b) a diglycidyl ether of bisphenol A containing a fusion catalyst with
   (c) tetrabromobisphenol A, said glycidyl ethers (a) and (b) being in a weight ratio of from 2:1 to 2.5:1, respectively, said fusion product having an average molecular weight of between 500 and 700.

2. The composition of claim 1, wherein the fusion product contains from 30% to 100% reacted tetrabromobisphenol A units by total weight.

3. The composition of claim 1 wherein the resin composition additionally comprises solvent for the fusion product.

4. The composition of claim 3, wherein the solvent comprises methoxyethanol.

5. The composition of claim 3, which has a resin solids content of from 70 to 85% by total weight.

6. The composition of claim 5, which contains a resin curing agent.

7. A process for the production of the composition of claim 1, comprising forming a dispersion of fusion catalyst, tetrabromobisphenol A and glycidyl ethers (a) and (b), heating said dispersion to an elevated fusion temperature of not more than 120° C., holding said dispersion at said elevated temperature until solution occurs and the resultant fusion product of said resin reaches an average molecular weight of between 500 and 700, and cooling said dispersion to below 50° C.

8. The process of claim 7, wherein the elevated fusion temperature is within the range of from 100° to 120° C.

9. The process of claim 8, wherein the dispersion is held within said range for from 10 to 20 minutes.

* * * * *